United States Patent
Stevens

(10) Patent No.: US 10,919,220 B2
(45) Date of Patent: Feb. 16, 2021

(54) DIRECTED INK DEPOSITION OF ADDITIVE MATERIAL USING A NEEDLE BRUSH

(71) Applicant: Carbon Design Innovations, Inc., Burlingame, CA (US)

(72) Inventor: Ramsey Stevens, Burlingame, CA (US)

(73) Assignee: CARBON DESIGN INNOVATIONS, INC., Burlingame, CA (US)

( * ) Notice: Subject to any disclaimer, the term of this patent is extended or adjusted under 35 U.S.C. 154(b) by 270 days.

(21) Appl. No.: 15/457,913

(22) Filed: Mar. 13, 2017

(65) Prior Publication Data

US 2017/0259498 A1  Sep. 14, 2017

Related U.S. Application Data

(60) Provisional application No. 62/316,505, filed on Mar. 31, 2016, provisional application No. 62/307,389, filed on Mar. 11, 2016.

(51) Int. Cl.
*B29C 64/209* (2017.01)
*B29C 64/106* (2017.01)
(Continued)

(52) U.S. Cl.
CPC .......... *B29C 64/209* (2017.08); *B29C 64/106* (2017.08); *B29C 64/205* (2017.08);
(Continued)

(58) Field of Classification Search
CPC . B29C 64/10–209; B33Y 10/00; B33Y 30/00; B33Y 50/00–02
See application file for complete search history.

(56) References Cited

U.S. PATENT DOCUMENTS 6,270,946 B1 * 8/2001 Miller ................. B82B 3/00
430/296
7,416,699 B2   8/2008 Dai et al.
(Continued)

OTHER PUBLICATIONS

Huang, J.Y. et al., "Nanowire liquid pumps", Nature nanotechnology, vol. 8, No. 4, Mar. 31, 2013, pp. 277-281.

*Primary Examiner* — Dah-Wei D. Yuan
*Assistant Examiner* — Stephen A Kitt
(74) *Attorney, Agent, or Firm* — File-EE-Patents.com; Jay A. Chesavage

(57) ABSTRACT

A technique to have precise materials deposition in the micro and nanometer scale relating to 3D printing. A microfluidic pipette and an atomic force microscopy (AFM) needle are used to position the pipette a distance from a working stage to avoid surface tension physics associated with droplet formation of pipette excreted material, "ink." The combination provides greater control over both the amounts of placement of the ink. In practice, both the AFM needle and the pipette are lowered to a work stage (or the stage is raised to the AFM needle). The pipette excretes a pool of ink onto the stage and the AFM needle is placed into the pool. A unit of ink from the pool adheres to the AFM needle. The AFM needle then moved to a work space on the stage and deposits the ink in the work area through a predetermined printing technique. The system is capable of printing photoresist, polymers, nanomaterials, DNA, proteins, stem cells, semiconductors, metal, plastic and almost anything imaginable. Common uses would include prototyping, maskless lithography, tissue engineering and bioprinting.

31 Claims, 14 Drawing Sheets

(51) Int. Cl.
*B33Y 10/00* (2015.01)
*B33Y 30/00* (2015.01)
*B33Y 50/02* (2015.01)
*B29K 105/00* (2006.01)
*B29C 64/205* (2017.01)

(52) U.S. Cl.
CPC ....... *B29K 2105/0058* (2013.01); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 7,601,650 B2 | 10/2009 | Stevens |
| 8,081,361 B2 | 12/2011 | Stevens |
| 2002/0063212 A1* | 5/2002 | Mirkin ................... B82Y 30/00 250/306 |
| 2005/0035983 A1* | 2/2005 | Cruchon-Dupeyrat ...................... B82Y 10/00 346/140.1 |
| 2006/0242740 A1* | 10/2006 | Collier ................... B82Y 10/00 430/3 |
| 2007/0295920 A1 | 12/2007 | Botchway et al. |
| 2009/0133169 A1* | 5/2009 | Mirkin ................... B01L 3/0255 850/40 |
| 2011/0168954 A1 | 7/2011 | Stevens |

\* cited by examiner

Tripod Scanner Based on Three Capacitor Stacks

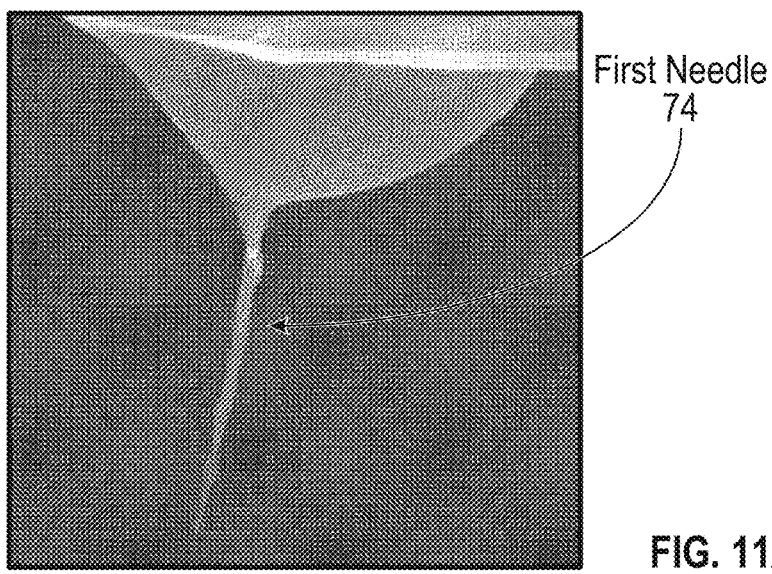
FIG. 11A — First Needle 74
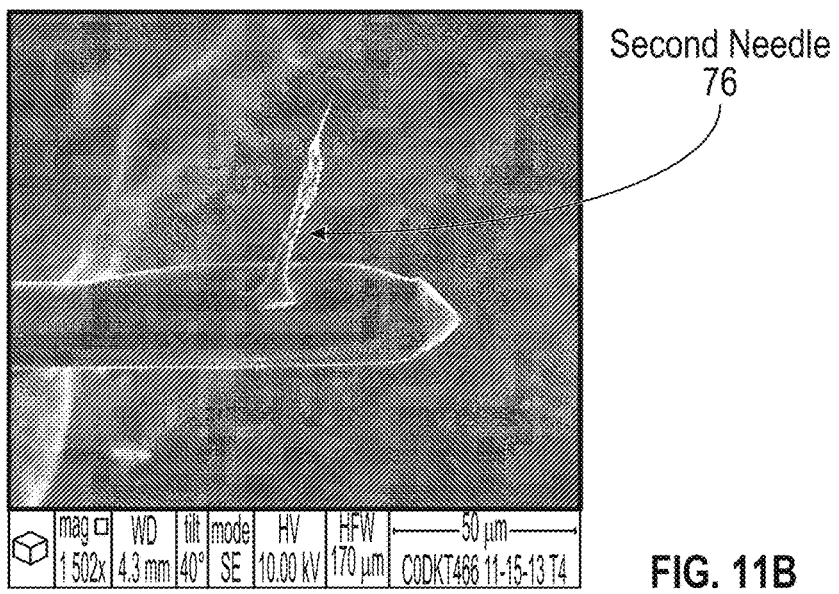
FIG. 11B — Second Needle 76
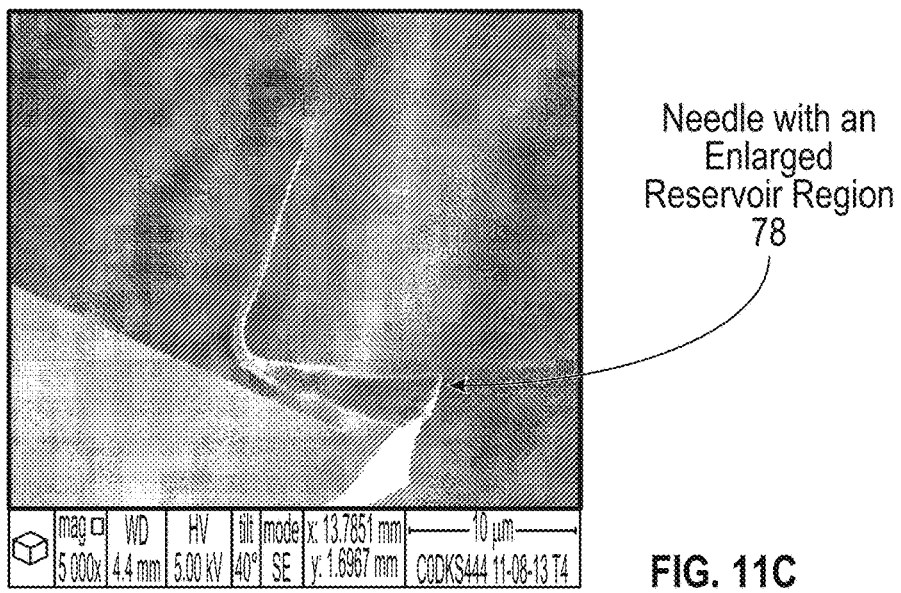
FIG. 11C — Needle with an Enlarged Reservoir Region 78

Directed Microfluidic Deposition

DIRECTED INK DEPOSITION OF ADDITIVE MATERIAL USING A NEEDLE BRUSH

CROSS REFERENCE TO RELATED APPLICATIONS

This U.S. non-provisional patent application claims the benefit of U.S. provisional patent application Nos. 62/316,505, filed Mar. 31, 2016, and 62/307,389, filed Mar. 11, 2016, the entirety of each of these application are incorporated herein by this reference thereto.

INCORPORATION BY REFERENCE

All publications, patents, and patent applications mentioned in this specification are herein incorporated by reference in their entirety and for all purposes to the same extent as if each individual publication, patent, or patent application was specifically and individually indicated to be incorporated by reference and should be treated as if each was reprinted here.

Such incorporations include U.S. Pat. No. 7,416,699, entitled "Carbon Nanotube Devices"; US. Pat. Publication No. 2007/0295920, entitled "Optically Controllable Device"; U.S. Pat. No. 7,601,650, entitled "Carbon Nanotube Device and Process for Manufacturing Same"; U.S. Pat. No. 8,081,361, entitled "Carbon Nanotube Signal Modulator and Photonic Transmission Device;" US Pat. Publication No. 2011/0168954, entitled "Carbon Nanotube Based Composite Surface Enhanced Raman Scattering (SERS) Probe," and non-patent literature, Huang et al., *Nanowire Liquid Pumps* published in "Nature Nanotechnology" on Mar. 31, 2013 (available at http://li.mit.edu/NPapers/13/Huang13LoNatureNano.pdf) are incorporated by reference.

TECHNICAL FIELD

Teachings relates to precise deposition of microscopic amounts of material to a desired location. Teachings more particularly relates to 3D printing custom designed objects using a deposition needle brush.

BACKGROUND 3D printing, also known as additive manufacturing (AM), refers to various processes used to synthesize a three-dimensional object. In 3D printing, successive layers of material are formed under computer control to create an object. These objects can be of almost any shape or geometry and are produced from a 3D model or other electronic data source. The adding of material is done with a fast-drying liquid that is excreted from the printer. As one attempts to print precise or detailed objects, the ability to control fluid dynamics of the additive material or "ink" limits the accuracy and precision of the printing process.

BRIEF DESCRIPTION OF THE DRAWINGS

FIG. 11A is a first embodiment of a carbon nanotube needle;
FIG. 11B is a second embodiment of a carbon nanotube needle;
FIG. 11C is a third embodiment of a carbon nanotube needle including an enlarged reservoir region.

DETAILED DESCRIPTION

Disclosed herein is a technique to print very small objects using both an ink pipette and an atomic force microscopy (AFM) needle as a "brush." The combination provides greater control over both the amounts of placement of the ink. In practice, both the AFM needle and the pipette are lowered to a work stage (or the stage is raised to the AFM needle). The pipette excretes a pool of ink onto the stage and the AFM needle is placed into the pool. A unit of ink from the pool adheres to the AFM needle. The AFM needle then moved to a work space and deposits the ink in the work area through a predetermined printing technique.

After the deposition of the ink, the AFM needle returns to the pool to collect another unit of ink which is then placed with the first according to the 3D modelling file. The process repeats with the pipette replacing the spent ink pool as necessary until the programmed object is printed. The whole process resembles that of finger painting on a very small scale.

Figure 1A:
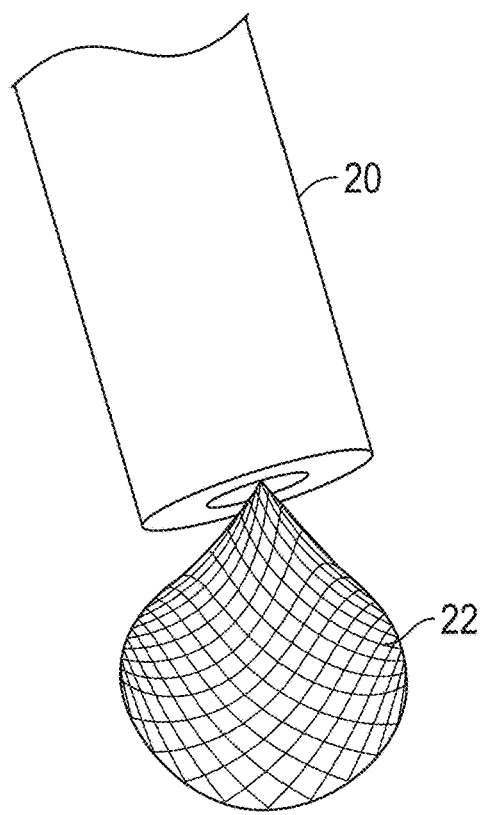
FIG. 1A is an illustration of a materials pipette in an elevated position.
Figure 1B:
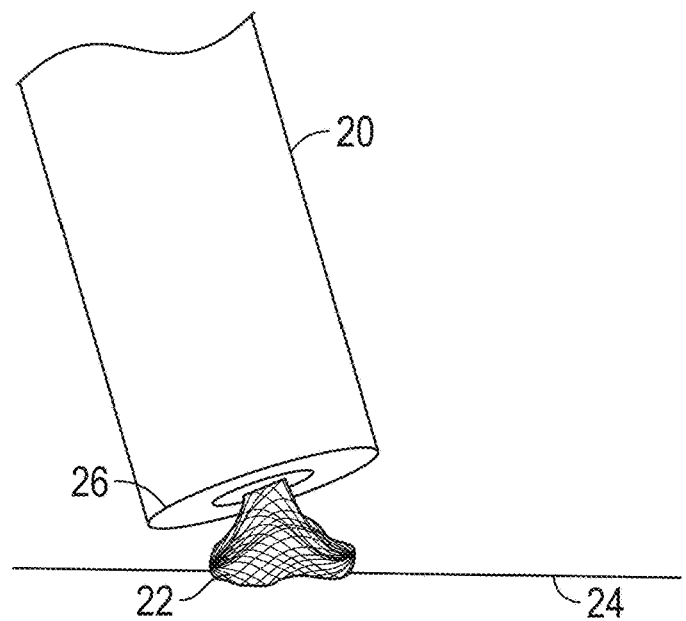
FIG. 1B is an illustration of a materials pipette in a lowered position.

FIGS. 1A and 1B are illustrations of an microfluidic materials pipette 20 in both elevated and lowered positions. 3D printers often function using nozzles or microfluidic pipets which excrete the additive material ("ink") 22 onto a work surface 24. There are a number of techniques including ink jet and drop cast. As a printer approaches the micro and nano scale, the volume, shape and location of the excreted material become increasingly difficult to control. At this scale, the physical rules of surface tension and droplet formation dominate. Droplets form which are much larger than the opening on the materials pipet.

To prevent droplets from forming and to deposit smaller volumes than a droplet, the materials pipette 20 is lowered much closer to the work surface 24. Given a narrow enough distance from the surface (the exact distance depends on the material used as ink 22), deposited material is unable to form into droplets because the material instead flows directly onto the work surface 24. However, when approaching the micro or nano scale, determining the exact location and height of the materials pipette 20 relative to the work surface 24 is increasingly difficult. To determine and accurately set the height of the materials pipette 20, an atomic force microscopy (AFM) needle with a known height differential between needle top and materials pipette tip 26 is used.

Figure 2:
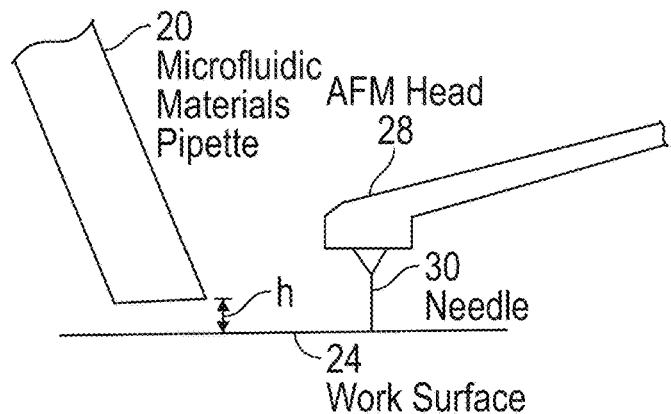
FIG. 2 is an illustration of an AFM probe with a materials pipette having a known height differential, "h"

FIG. 2 is an illustration of an AFM probe 28 with a materials pipette having a known height differential, "h." The materials pipette and AFM needle 30 are lowered to the work surface together (or a stage is raised to the materials pipette and AFM needle). Once the AFM needle 30 touches down on the surface/stage 24, the known height differential between the AFM needle and the materials pipette tip, "h" serves as a height parameter for the materials pipette 20. The materials pipette 20 is set to the work surface/stage 24 accurately. The 3D printer system is capable of printing with a number of inks 22 including: photoresist, polymers, nanomaterials, DNA, proteins, stem cells, metal, semiconductors, dielectrics, plastic and with other suitable materials known in the art.

Figure 3:
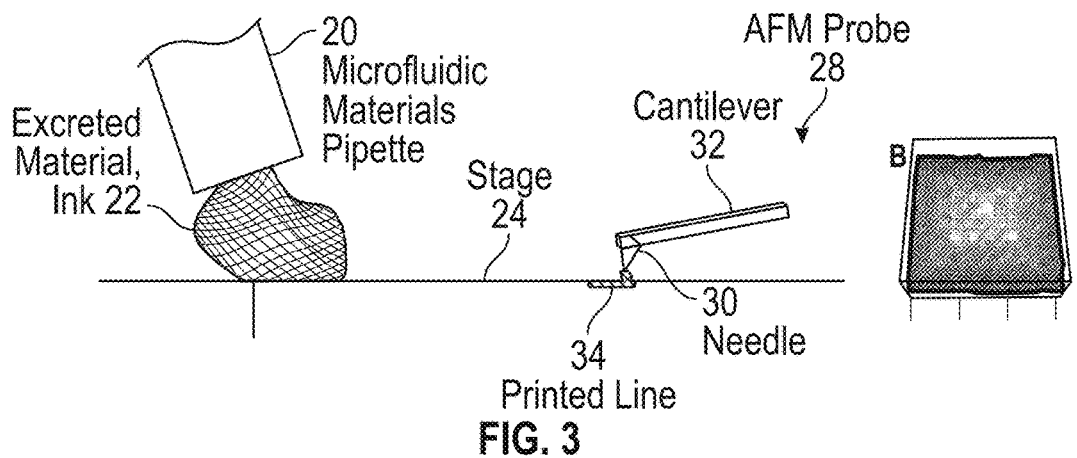
FIG. 3 is an illustration of an atomic force microscopy (AFM) probe and needle.

FIG. 3 is a side view of a system to print microscopic 3D objects according to various embodiments. AFM is one kind of scanning probe microscopes (SPM). SPMs are designed to measure local properties, such as height, friction, magnetism, with a probe. To acquire an image, the SPM raster-scans the probe over a small area of the sample, measuring the local property simultaneously. AFM techniques often have up to 0.1 nm of vertical resolution.

Piezoresponse force microscopy (PFM) is a variant of AFM that allows imaging and manipulation of ferroelectric domains. This is achieved by bringing a sharp conductive probe into contact with a ferroelectric surface (or piezoelectric material) and applying an alternating current (AC) bias to the probe tip in order to excite deformation of the sample through the converse piezoelectric effect (CPE). The resulting deflection of the probe cantilever is detected through standard split photodiode detector methods and then demodulated by use of a lock-in amplifier (LiA). In this way topography and ferroelectric domains can be imaged simultaneously with high resolution. Among other things, PFM techniques improve lateral resolution to the sub-angstrom range.

AFM probes 28 include a needle 30 positioned at the end of a flexible cantilever 32. In some embodiments the needle 30 is a carbon nanotube. The AFM probe 28 is placed in contact with a stage 24 and has very precise location tracking. Displayed in the figure, the AFM probe 28 is combined with a microfluidic pipette 20 that excretes working material, or ink 22. The ink 22 is used to generated printed work 34.

Figure 4:
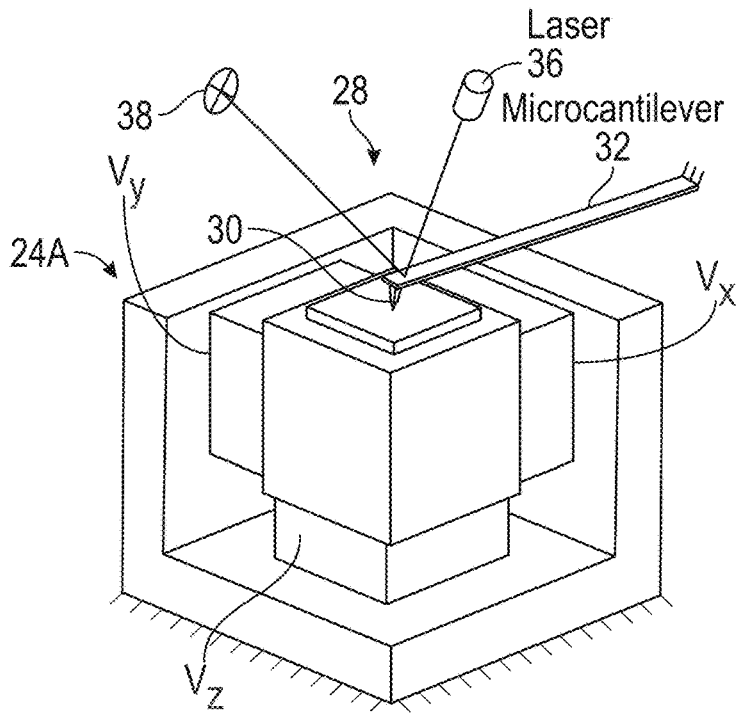
FIG. 4 is an illustration of an xyz long-travel piezo stage.

FIG. 4 is an illustration of an xyz long-travel piezo stage 24A. In some embodiments, The AFM probe 28 and materials pipette 20 do not physically move. Instead, a mobile stage 24A with xyz range of motion directs the work space around the AFM needle 28 and pipette 20. In other embodiments, the cantilever 32 upon which the AFM needle 30 is affixed includes one or more actuators to enable xyz range of motion. The materials pipette 22 additionally includes actuators that provide at minimum a vertical range of motion. The AFM probe 28 is tracked by shooting a laser 36 at the AFM probe 28 and detecting alterations of the reflected laser 36 on a detector 38. In still other embodiments, a combination of stage movement and actuation of the materials pipette and AFM are used.

The range of motion of the mobile stage/actuators is suitable to "dip" or position the AFM probe 28 in the ink 22 deposited by the materials pipette 20 to the stage 24 and then "write" or contact the work surface. Ink 22 adheres on contact to the AFM needle 30. The AFM needle 30 is repositioned to another zone of the work area designated for printing. In an illustrative analogy, imagine the additive material pool as a palette, and the designated printing area as a canvas.

In some embodiments, because there is potential loss of precision and location tracking when the AFM probe 28 is lifted and dipped into the ink 22, a second tracking AFM needle 30 maintains continued contact with the surface/stage. There are a number of implementations of the use of a second AFM needle 30.

Figure 5:
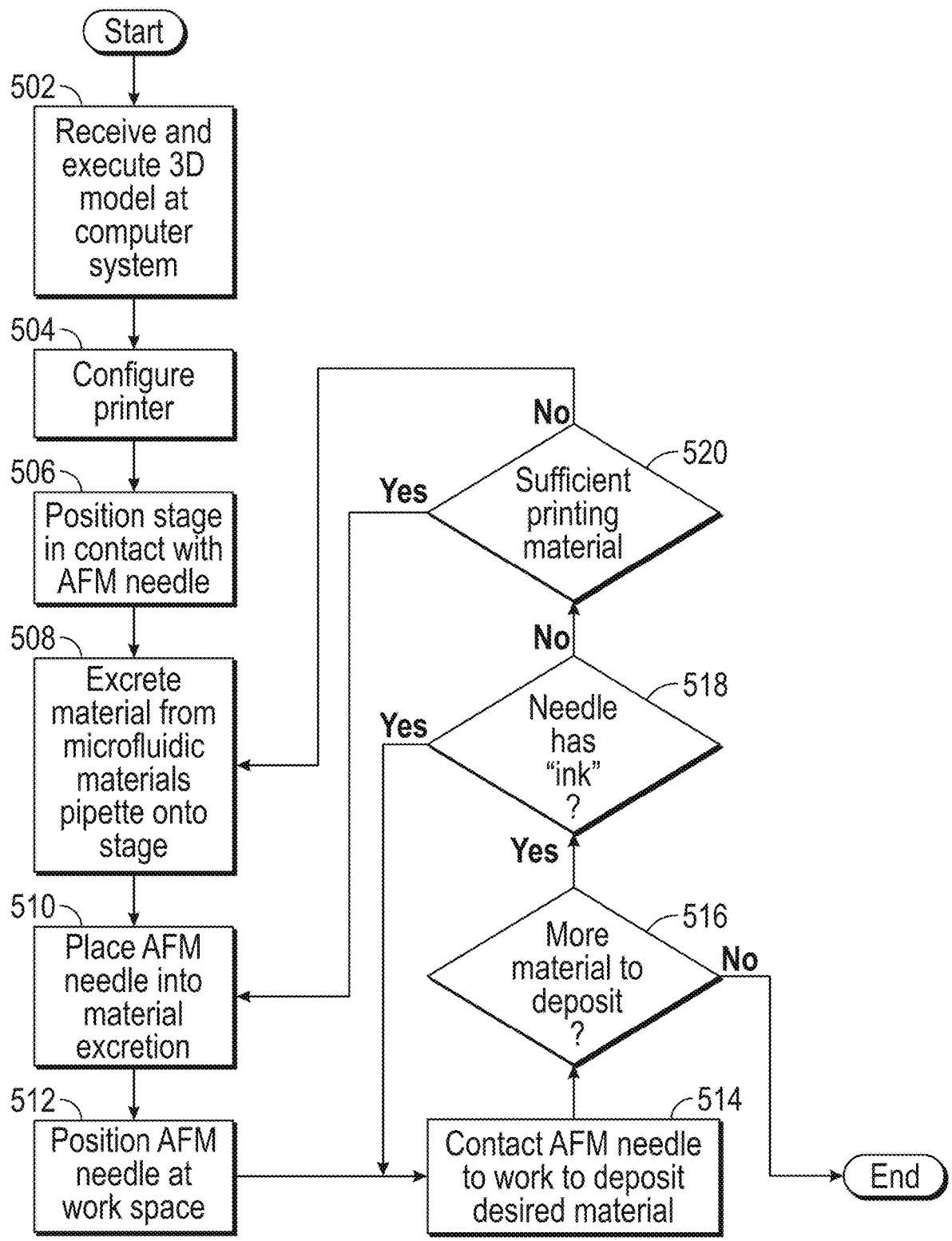
FIG. 5 is a flow chart depicting an embodiment of a micro to nanoscale printing process.

FIG. 5 is a flow chart depicting an embodiment of a micro to nanoscale printing process. In step 502, a computer system receives a 3D model file which a user wants printed. The source of the 3D model is a suitable modeling program known in the art. Once received, the computer system executes a printing module and sends instructions to the 3D printer. In step 504, the printer is configured for the job. Configuration includes setting the proper parts to use for the desired scale of project. As a result that the 3D printer can print items in a wide array of sizes, some components are switched out. The needle or carbon nanotube (CNT) used to print lines 100 micrometers in diameter/thickness would not be suitable to print lines 20 nanometers in diameter/thickness. Similarly, the microfluidic materials pipette is positioned to a height "h" depending on the material used as ink, and the relevant amounts for the given project. Finally, the stage or work space would also vary depending on the size scale of the project to be printed.

to In step 506, the printer brings the stage and needle into contact with the stage. Due to a known height differential with the materials pipette, the pipette is positioned according to predetermined specifications relating to the material and project scale. In step 508, the materials pipette excretes a desired amount of working material, or ink onto the stage. The working material may be a liquid solution, paste, extrusion, or other matter which may be excreted through a microfluidic pipette.

In step 510, the printer places the AFM probe including the needle into the material excretion from the pipette. The working material then adheres to the needle. In step 512, the printer positions the "wet" needle including ink to the printing area of the stage. In step 514, the printer contacts the needle to the printing area and deposits the working material. Alternatively, where the printing project is in progress, the printer contacts the needle to the next portion of the project and deposits the working material as programmed by the 3D model file.

In the following three steps, the process has a number of queries which either end the process, or select a prior step to return to. In step 516, the printer consults the 3D model file to determine if additional printing moves need be made. If not, the project is done and the process ends. If so the process moves to the next query.

In step 518, the printer determines if there is remaining ink on the needle. This is determined by comparing known characteristics of the ink material with known specifications of the used needle to determine the amount of material the printer expects the needle draws when placed in the material excretion, and the rate upon which the needle deposits said material. Where there is remaining ink on the needle, the printer moves on to the next deposition repeating step 514. Where there is not enough ink on the needle, the process moves to the next query.

In step 520, the printer determines if the material excretion has enough material for the needle to be "dipped back in the ink." Similarly to step 518, this determination is made by comparing the characteristics of the user chosen ink material, and the specifications of the needle. If the printer calculates that ink still remains, the process returns to step 510. When the printer calculates additional ink material excretion is required, the process returns to stop 508.

Figure 6:
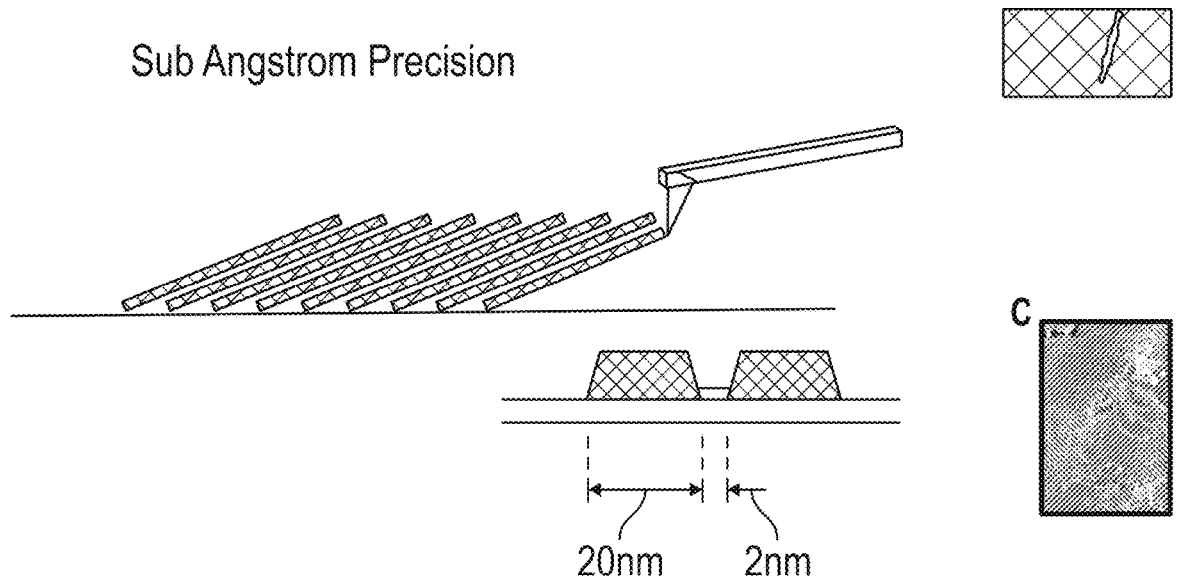
FIG. 6 is an illustration of materials placement precision.

FIG. 6 is an illustration of materials placement precision. It is noted that while particular needles may have certain limitations on the drawing diameter/thickness, the placement of the materials deposition is as precise as the AFM probe used. As noted, AFM probes often measure with 0.1 nanometer precision. Thus, the placement of materials deposition is of a similar level of precision. Even if a given set of drawn lines have a width of 20 nanometers, the lines can be drawn within a much smaller range of one another. In this way, a nanoscale 3D printer can print trenches which are much smaller than the resolution of the printer.

Figure 7A:
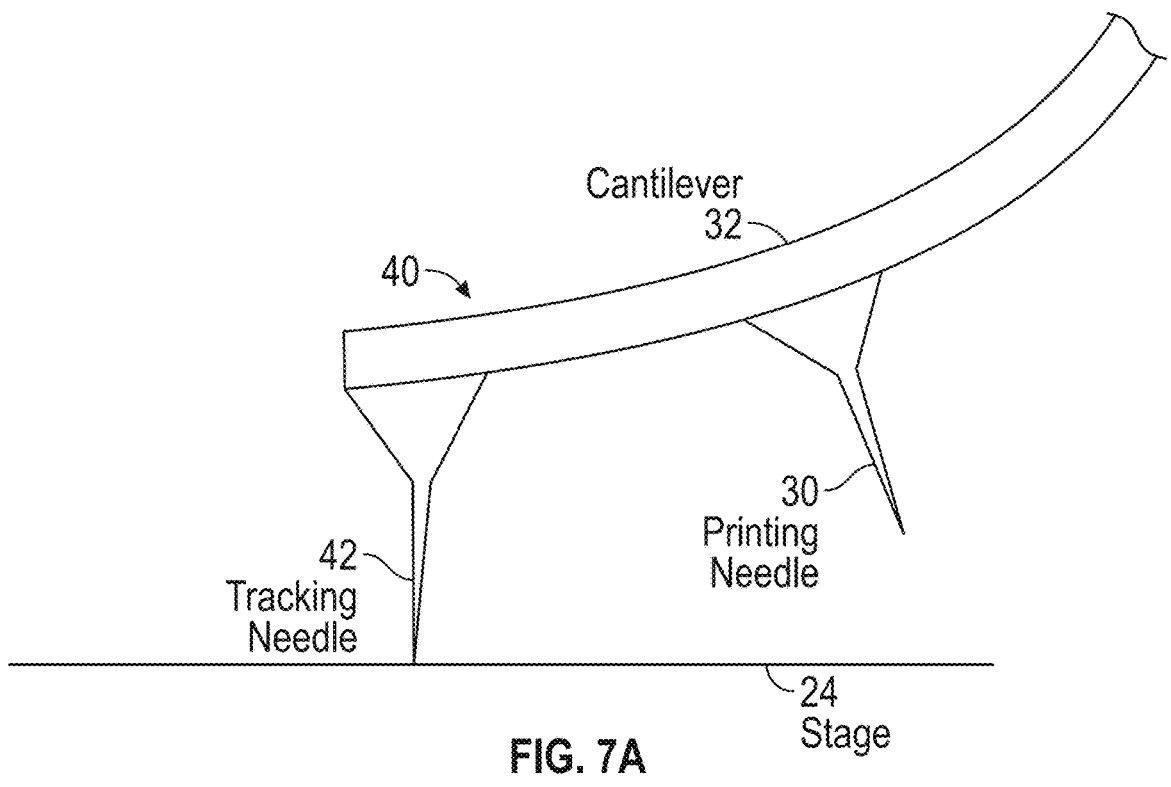
FIG. 7A is an illustration of a double needled cantilever in a raised position.
Figure 7B:
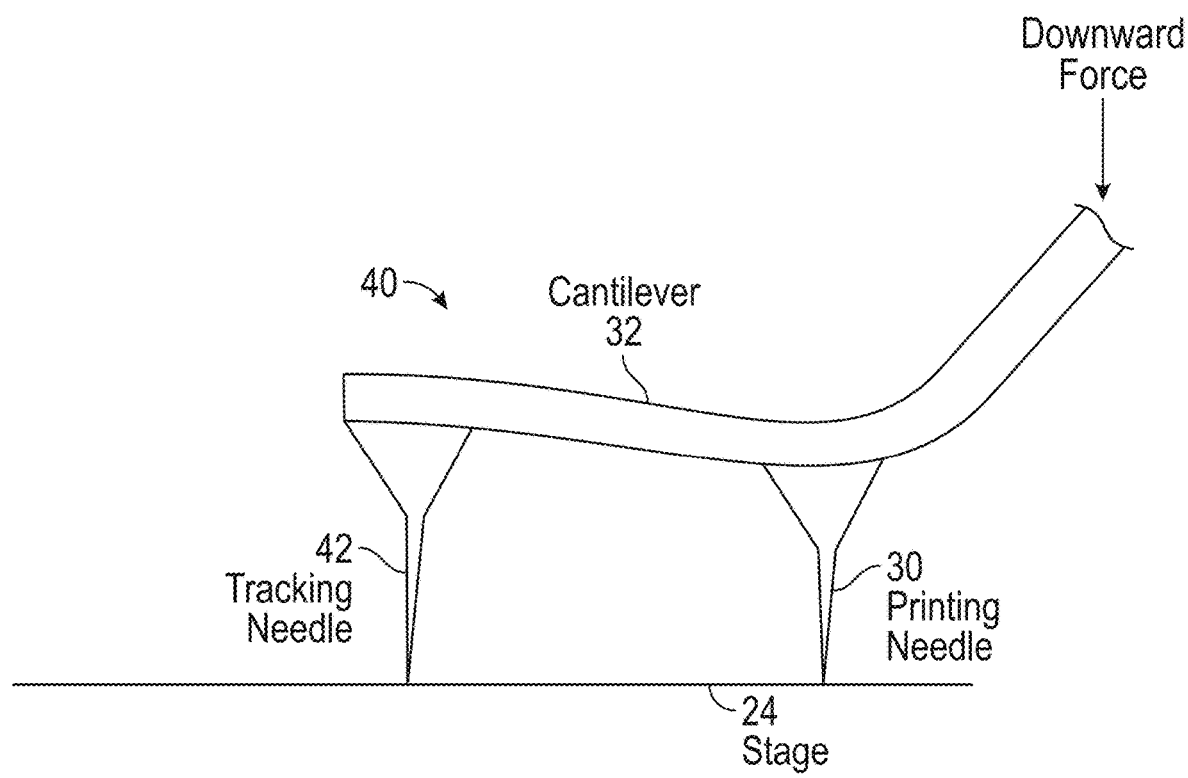
FIG. 7B is an illustration of a double needled cantilever in a lowered position.
Figure 7C:
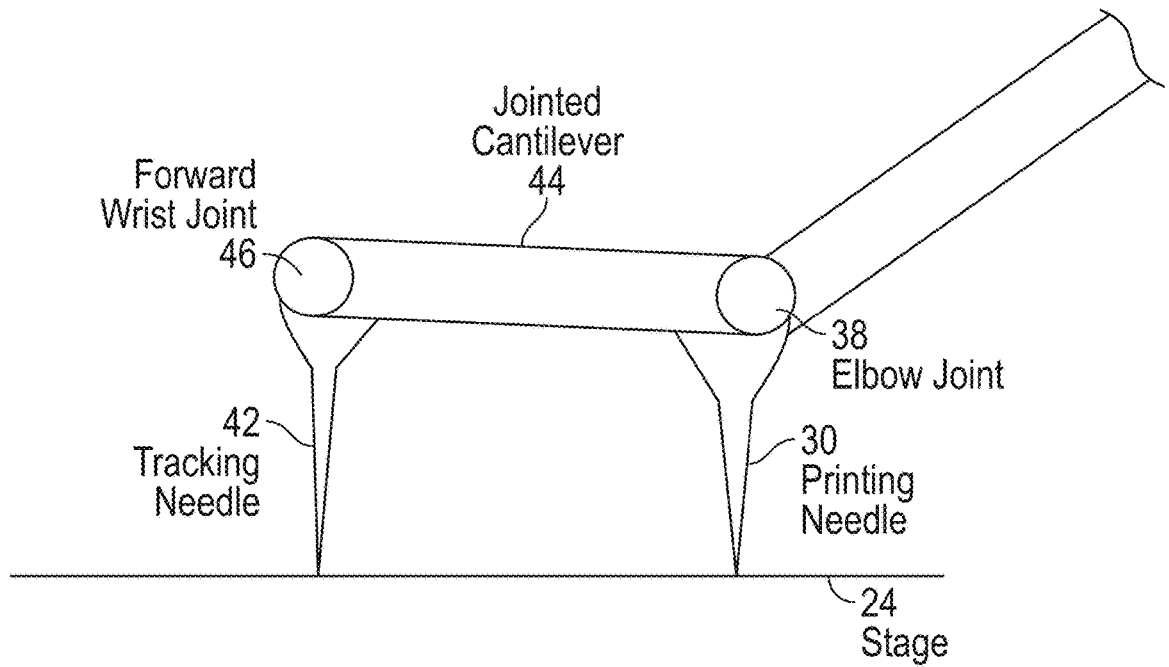
FIG. 7C is an illustration of a jointed double needled cantilever in a lowered position.

FIGS. 7A, 7B, and 7C are an illustrations of embodiments of a double needled probe 40. In some circumstances, lifting the AFM probe's needle 30 from the stage reduces accuracy of the probe. Thus, in some embodiments the printer includes two needles 30, 42, a tracking needle 42 and a printing needle 30. An AFM probe cantilever 32 flexes and bends through normal use. The flexion influences the position of a laser on a detector. The first needle, the tracking needle 42 is positioned so as to make continued contact with the stage 24 and enable the double needled probe 40 to generate high resolution positioning data. In some embodiments, the angle and extension of the cantilever 32 causes a second needle, a printing needle 30 to touchdown to the stage 24. FIG. 7B illustrates an embodiment where downward force is applied and removed from the base end of the cantilever 32 which vertically actuates the printing needle 30. Vertical actuations of the printing needle 30 enable the 3D printer to dip the needle into ink 22, lift, then lower again onto the working surface 24 or printed work 34.

FIG. 7C illustrates an alternate cantilever 44 which includes joints which enable the cantilever to articulate smoothly so as to not disturb the angle of the tracking needle. The joints include a forward wrist joint 46 and an elbow joint 48.

Figure 8:
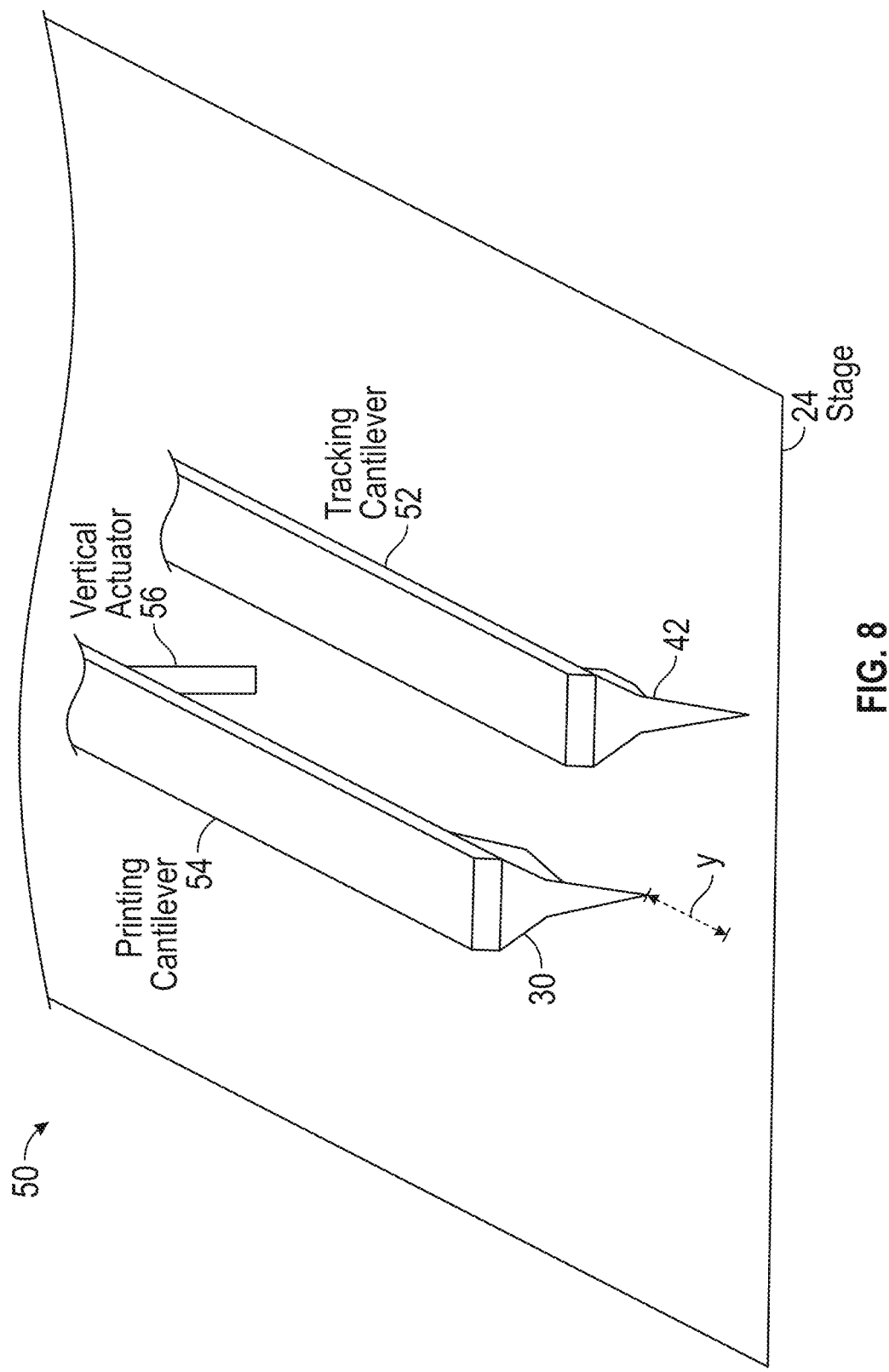
FIG. 8 is an illustration of a dual cantilever AFM probe.

FIG. 8 is an illustration of an embodiment of an dual cantilever AFM probe 50. As with the double needled cantilever 40, two needles, both a tracking needle 42 and a printing needle 30 are used. However, in the displayed embodiment, two cantilevers are used as well. A tracking cantilever 52 is set at a fixed position laterally relative to a printing cantilever 54. While it is not necessary that the pair of cantilevers 52, 54 are parallel to one another as displayed, the printer does have a known relative location of the printing cantilever 52 and needle 30 with respect to the tracking cantilever 52 and needle 42. An actuator 56 raises and lowers the printing cantilever 54 enabling the printing needle 30 to position into the ink 22 and then back to the work space on the stage 24 to deposit material.

Figure 9:
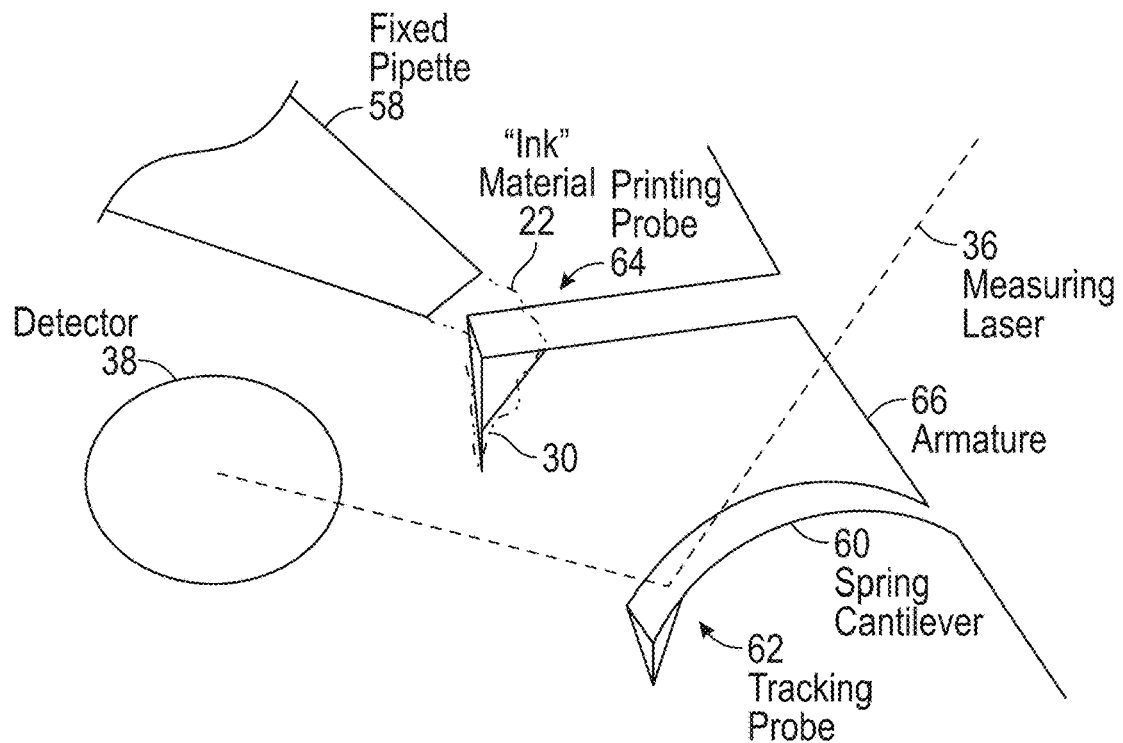
FIG. 9 is an illustration of a dual cantilever AFM probe with a fixed pipette and a spring tracking cantilever.

FIG. 9 is an illustration of a dual cantilever AFM probe 50 with a fixed pipette 58 and a spring tracking cantilever 60. In some embodiments, the tracking probe 62 is on a spring cantilever 60 that rests at a lower height than the printing probe 64. The touchdown point of the printing probe 64 occurs at a known spring cantilever force as measured by a measuring laser 36 reflected off the spring cantilever into a detector 38 (similarly to how an AFM probe normally operates). In this way, the tracking probe 62 stays in contact with the stage 24 even when a support 66 including both the printing probe 64 and the tracking probe 62 is lifted.

In embodiments where the tracking probe 62 collects all measurements of the location of the printing probe 64, no laser measurements need be made reflected off the printing probe 64. As a result, the materials pipette 58 may be positioned fixed over the printing probe 64 and deposit printing material/ink 22 over the top of the printing probe 64 head. The ink 22 runs down the needle 30 and is applied to the work surface.

Figure 10:
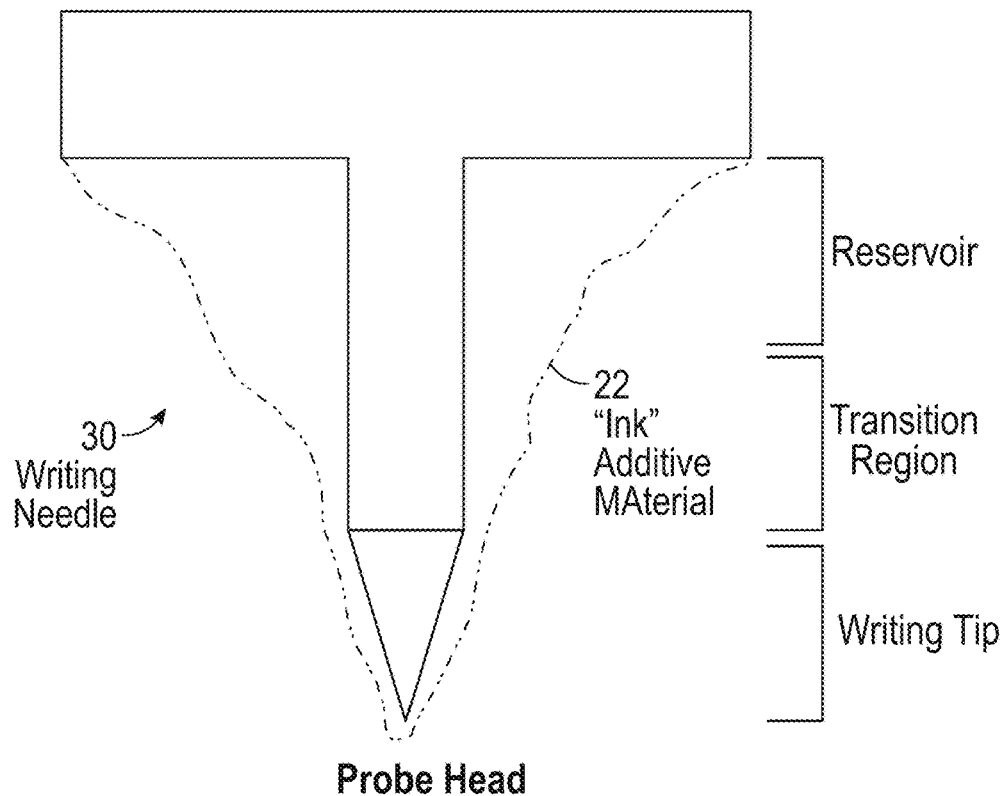
FIG. 10 is an illustration of a unit of additive material collected on an AFM printing needle.

FIG. 10 is an illustration of a unit of ink 22 collected on an AFM needle 30. When the needle 30 is dipped into the ink 22 excreted by the materials pipette 20, the ink 22 collects on the needle 30. The ink 22 collects in three zones on the needle 30. The greatest concentration collects at the base of the needle 30 where the greatest surface area is presented in which ink 22 may collect. This region is a reservoir 68. Reservoirs 68, in this case, are where the greatest surface area is presented to retain ink 22 through surface tension.

On the point, there is a writing tip zone 70 where ink 22 is deposited on the contacted work surface. Between the first two regions 68, 70 is a transition region 72 where gravity allows ink 22 from the reservoir region 68 to fill in empty surface area that had cleared by depositing a prior unit of ink 22.

When the needle is again contacted with the stage, this material is deposited in a predictable quantity depending on the shape and structure of the needle. In some embodiments, the "writing" occurs through capillary action similar to an ink pen.

FIG. 11A is a first embodiment of a carbon nanotube needle 74.

FIG. 11B is a second embodiment of a carbon nanotube needle 76.

FIG. 11C is a third embodiment of a carbon nanotube needle 78 including an enlarged reservoir region 68. The tetrahedral shape in the image is the tip of the AFM probe upon which a carbon nanotube structure has been applied. The carbon nanotube is comprised of a vertical needle and a horizontal reservoir surface.

Figure 11D:
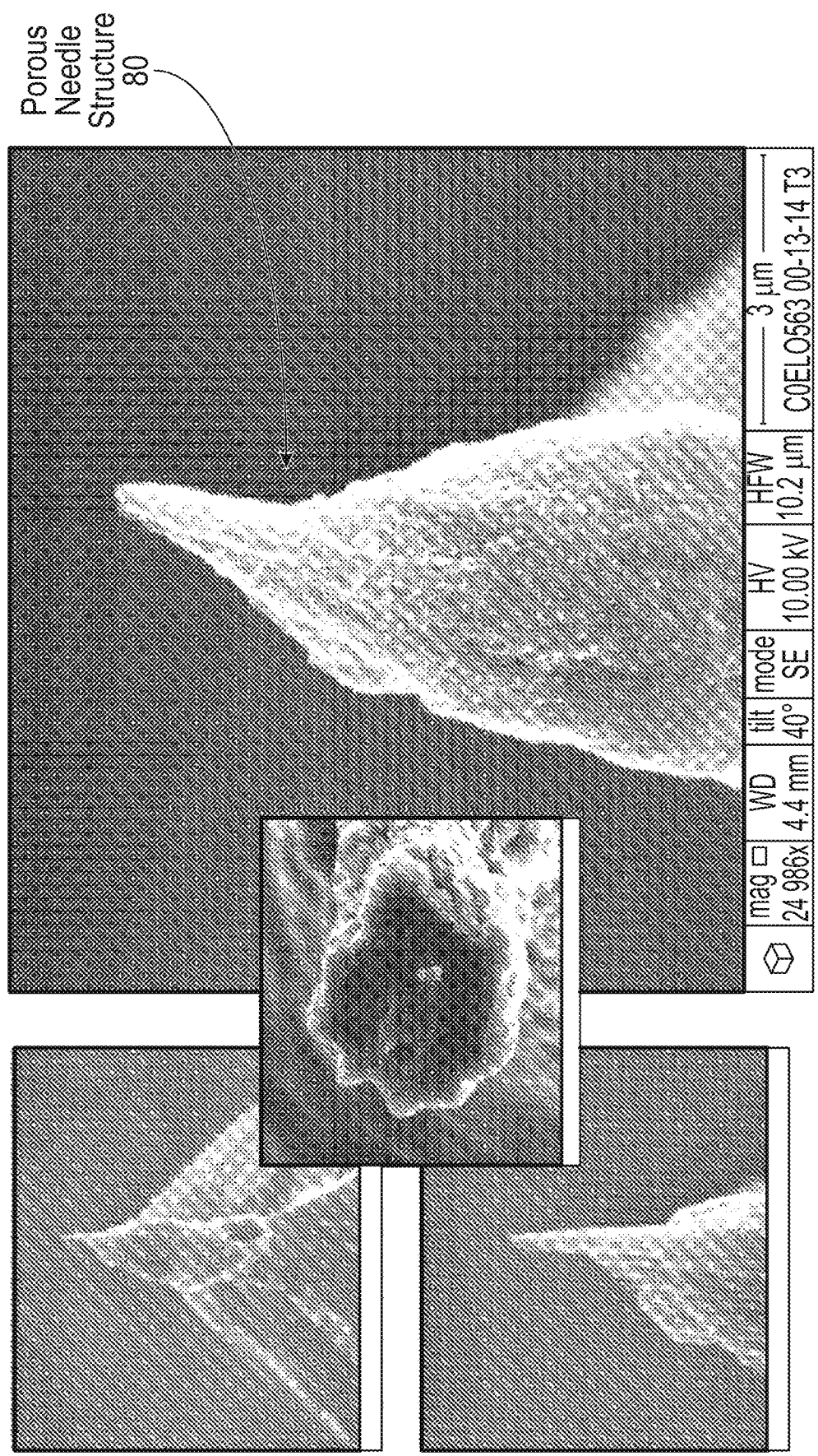
FIG. 11D is a close up of a carbon nanotube needle with a porous structure.

FIG. 11D is a close up of a carbon nanotube needle with a porous structure 80. Each view provided in the figure provides a different view to the very tip of a carbon nanotube needle. The structure of the needle includes a network of porous holes in order to better retain and adhere to ink 22.

Figure 11E:
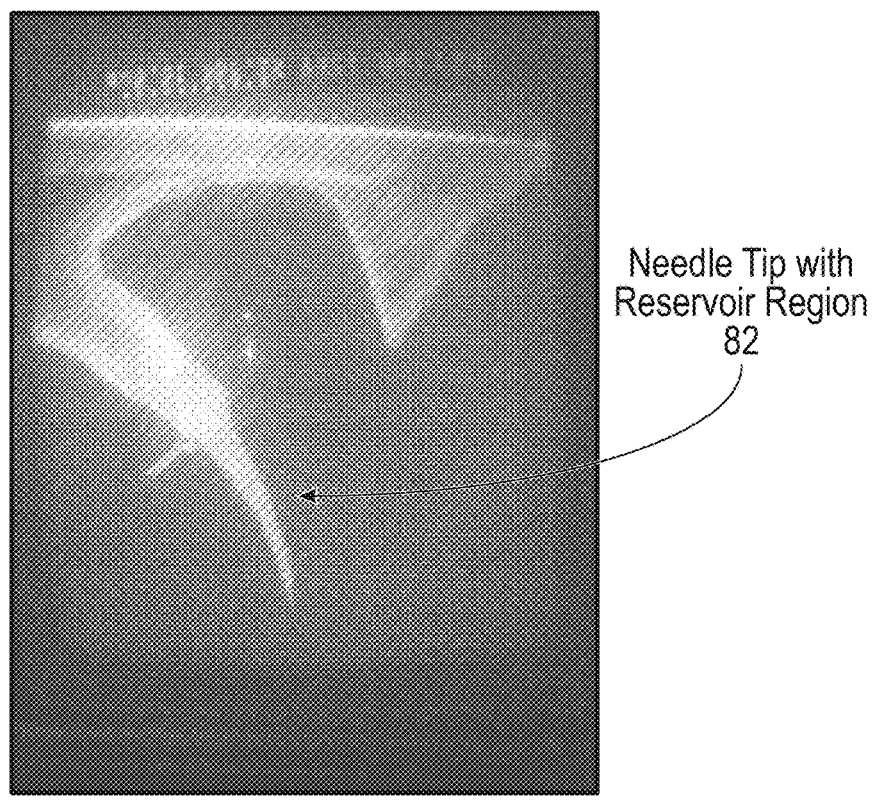
FIG. 11E is a fourth embodiment of a carbon nanotube needle with a reservoir created with the cantilever probe.

FIG. 11E is a fourth embodiment of a carbon nanotube needle 82 with a reservoir created with the cantilever probe. At the top right of the figure is an upside-down tetrahedral structure—this is the AFM probe tip. The curved structure below is the carbon nanotube needle. The curved structure enables ink 22 to collect between the needle and the AFM probe tip. The structure in this embodiment has increased reservoir space when compared to the embodiment of FIG. 10.

Figure 11F:
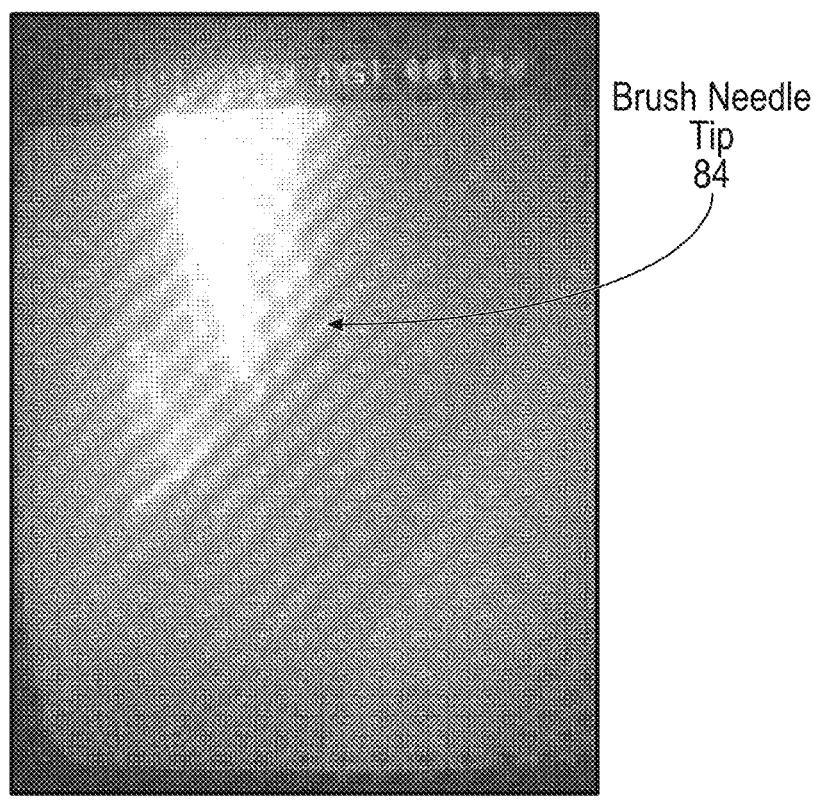
FIG. 11F is a fifth embodiment of a carbon nanotube needle with a brush structure.

FIG. 11F is a fifth embodiment of a carbon nanotube needle 84 with a brush structure. The carbon nanotube needle tip includes multiple points, each acting as if a bristle in a paintbrush. This embodiment of a carbon nanotube needle is useful for laying down ink 22 in a brush-like fashion.

Figure 12:
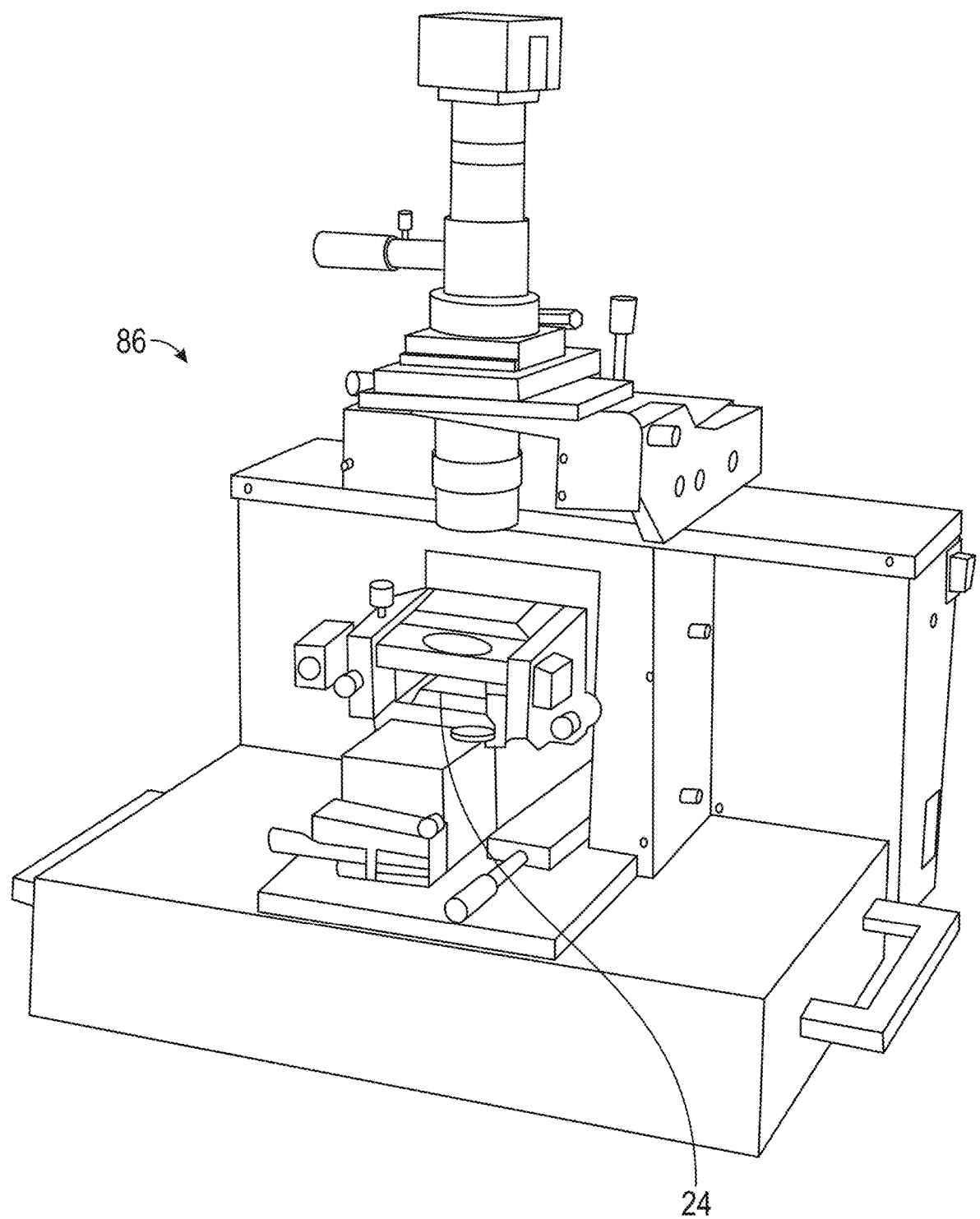
FIG. 12 is an illustration of a complete micro and nanoscale 3D printer.

FIG. 12 is an illustration of a complete micro and nanoscale 3D printer 86. Similar to visible scale 3D printers, the small scale 3D printer 86 uses an accompanying computer system having 3D model or tessellation files. A tessellation model is a collection of data files that can be used to digitally render an object for 3D printing, and to print the object using the 3D printer. Common file types of tessellation models include .3dm, .3ds, .blend, .bvh, .c4d, .dae, .dds, .dxf, .fbx, .lwo, .lws, .max, .mtl, .obj, .skp, .stl, .tga, or other suitable file types known in the art. These files are interpreted by printer software which provide instructions to the printer.

In this illustrative example an xyz long-travel piezo stage is used to position the AFM needle and microfluidic materials pipette.

Figure 13:
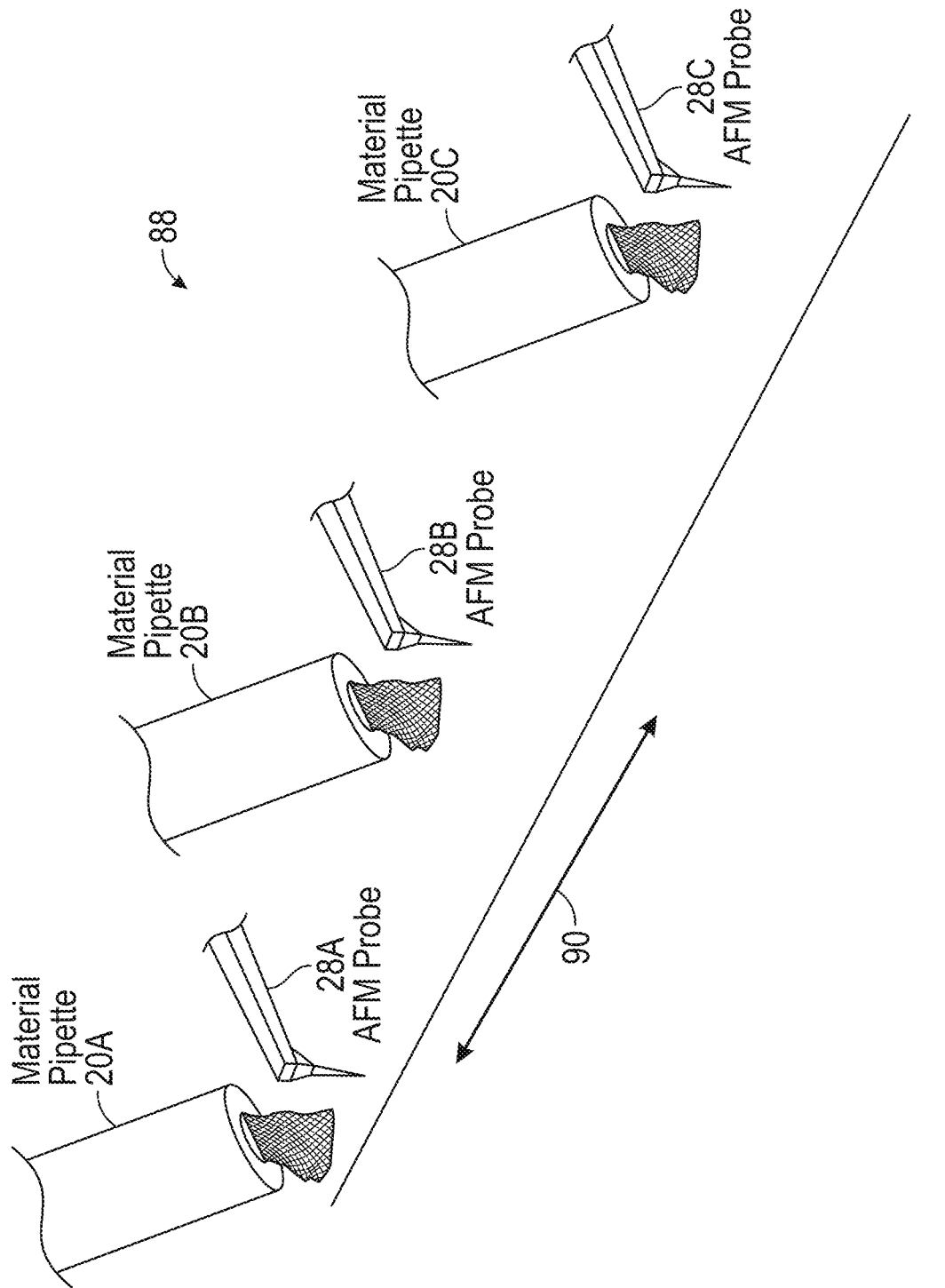
FIG. 13 is an illustration of a mass production assembly line embodiment for small scale 3D printing.

FIG. 13 is an illustration of a mass production assembly line embodiment for small scale 3D printing. In an assembly line 88 embodiment, the stage includes substantially more movement capability in order to shuttle a printing project from one pipette/probe combination to the next. This embodiment is referred to as a conveyor stage 90. This configuration is especially relevant where more than one type of additive material ink 22 is required for a given project. Each of the pipette/probe stations 22A-C, 28A-C is responsible for a particular subset of the printing operations and once completed, the conveyor stage 90 moves the print project on to the next station. One means of accomplishing this is to have a segmented conveyor stage 90 wherein the multiple stages, each which are enabled to push contents of the stage to the next stage move individually.

Figure 14:
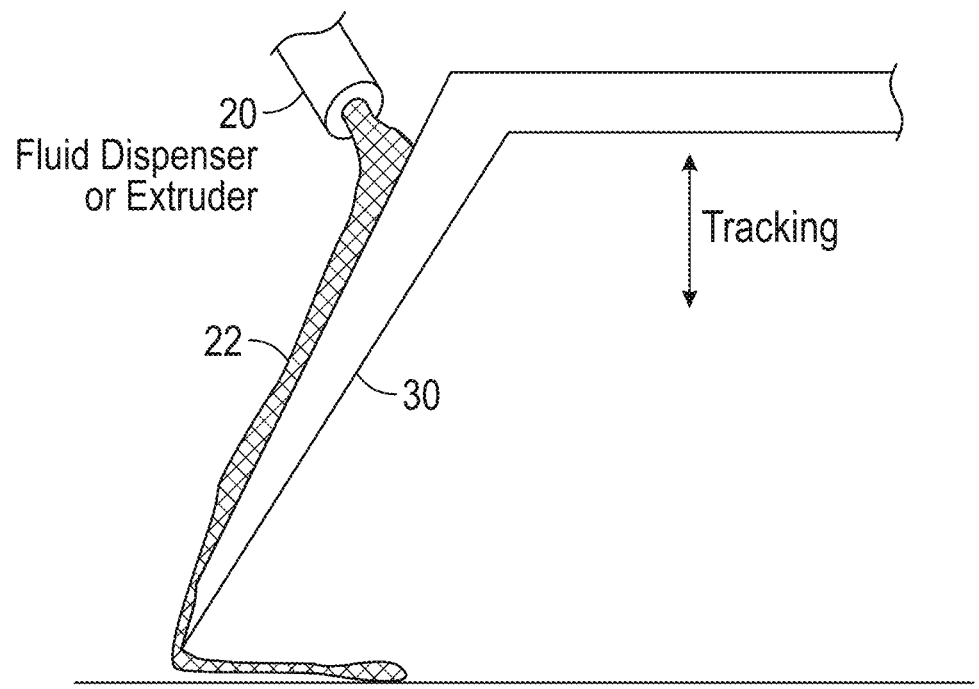
FIG. 14 is an illustration of a needle brush paired with an ink extruder.

FIG. 14 is an illustration of a needle brush paired with an ink extruder. The technique for applying "ink" 22 as deposited from the outer surface of a needle is useful at larger scales as well. At larger scales, precise measurement is less necessary 30 and thus careful monitoring of the needle brush through laser detectors and piezoelectricity are no longer as integral to the process. At the precision of hundreds of micrometers and larger, unassisted electric motors (in either the stage or a cantilever arm) can provide the necessary positioning. As a result that precise detectors are no longer required, the "arm" upon which the needle brush is positioned no longer needs to have the same flexing properties of a AFM cantilever.

In some embodiments, the needle brush is placed directly under the materials pipette which extrudes material directly onto the surface of the needle brush. Material runs down the length of the needle and is deposited on the stage or work subject. Depending on the material used as ink, running down the length of the needle brush to the work surface may be faster or slower than desired. Accordingly, flow control mechanisms are employed.

A first example of a flow control mechanism is through heating the needle brush. For ink materials that tend to dry quickly on the needle brush such as plastics, or polymers that are solids at normal atmospheric conditions, the needle brush may be heated to facilitate flow of the chosen ink.

Figure 15:
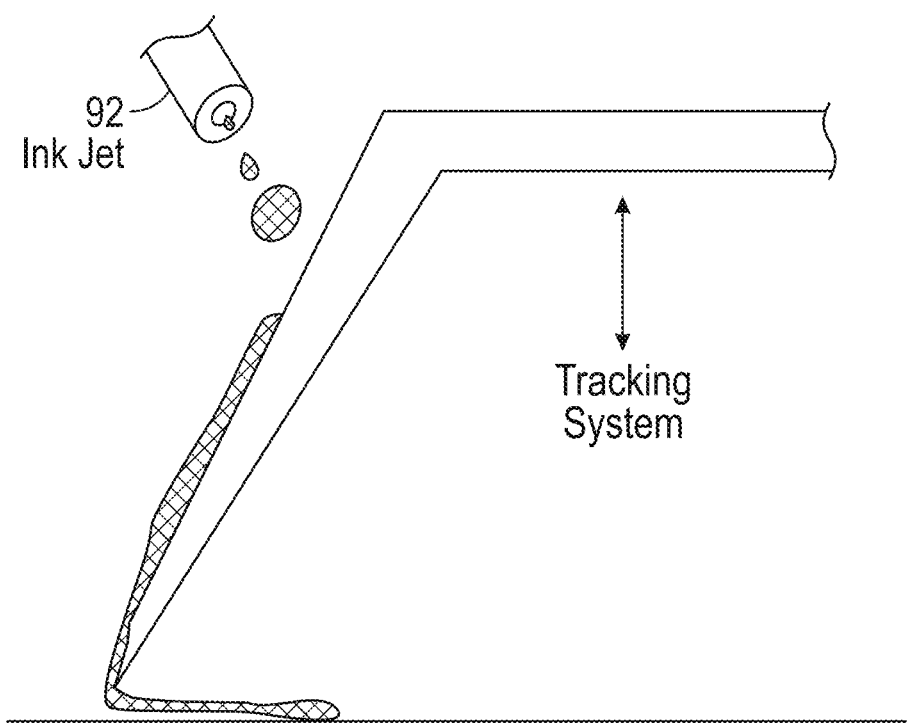
FIG. 15 is an illustration of a needle brush paired with an inkjet.

FIG. 15 is an illustration of a needle brush paired with an inkjet. In another embodiment of needle brush printing, the materials pipette may be at a greater distance from the needle brush and use an inkjet 92. Use of an inkjet 92 reduces the precision at which an amount of material may be extruded, though because depositions are performed by the needle brush 30, precise amounts of material are deposited despite larger amounts of material being extruded. Use of an inkjet 92 requires significantly less precision for construction of the relationship of the pipette to the needle brush. This also enables the needle brush to be mobile relative to the materials pipette.

Figure 16:
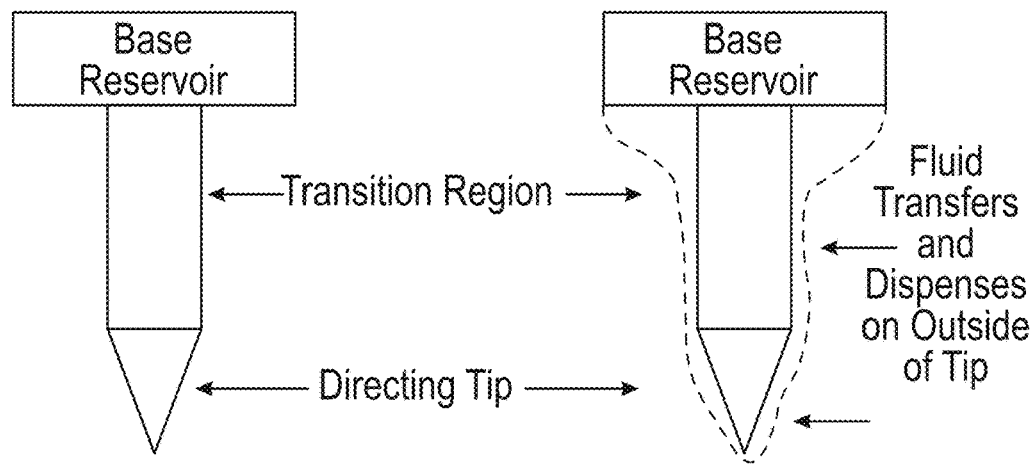
FIG. 16 illustrates material transfer properties of a needle brush.

FIG. 16 illustrates material transfer properties of a needle brush. The ink extrusion is provided from a reservoir to the base portion of a needle brush (or material directing tip). A flow control mechanism is used to controllably transfer the material from the base to the directing tip. Other examples of flow control mechanisms include electric fields and surface/material qualities such as chemistry, hydrophobicity, roughness, and other suitable material properties known in the art. Other flow control mechanisms include the use of gravity with wetting properties and contact angle with the work subject. Contact angles may be adjusted through the use of motorized arms, and or joints.

Figure 17:
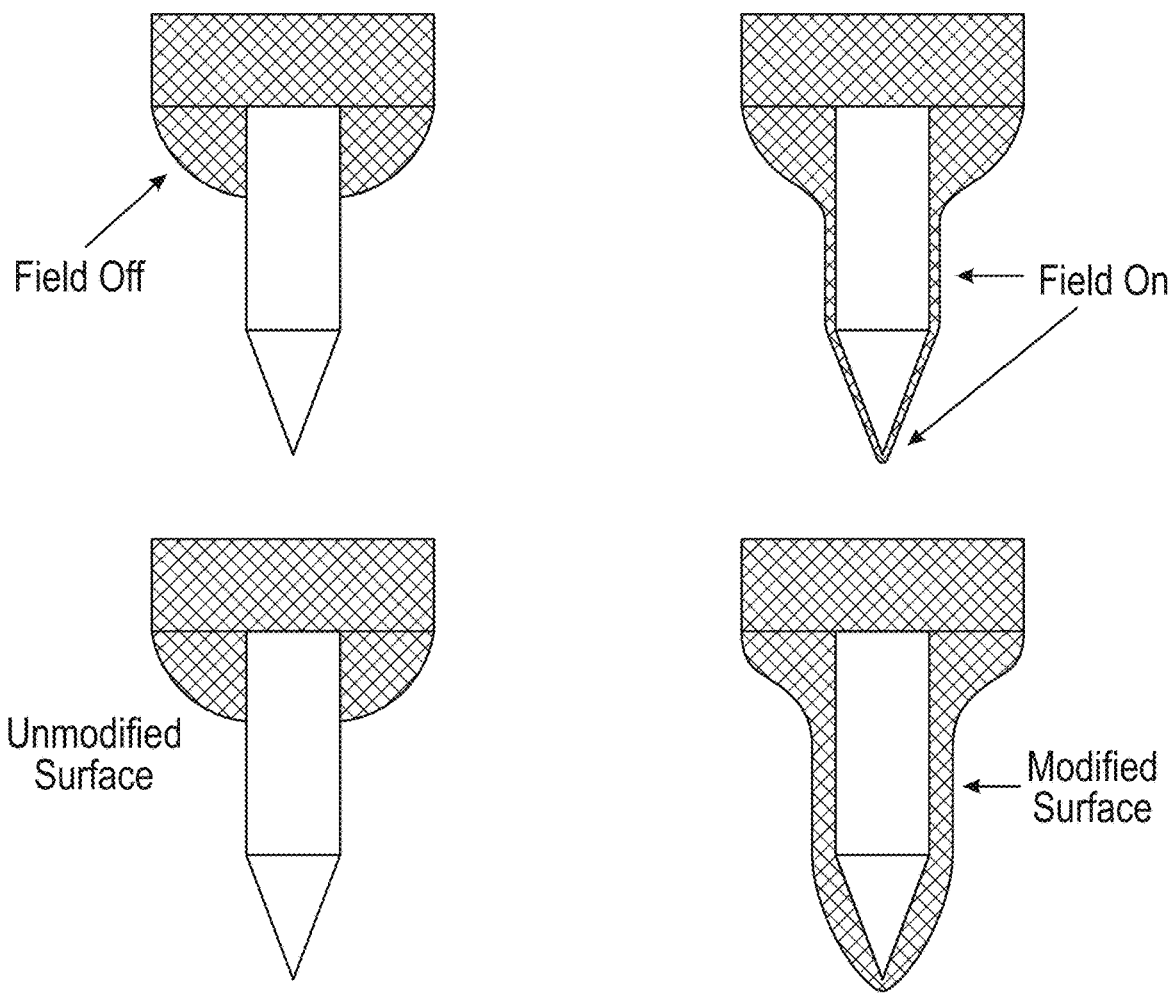
FIG. 17 illustrates control mechanisms for ink deposition with a needle brush.

FIG. 17 illustrates flow control mechanisms for ink deposition with a needle brush. The transfer of material is facilitated by mechanisms that affect the contact angle of the liquid solid interface. Contact angle is directly related to how a liquid "wets" a solid. When a drop is placed down on very clean glass, it spreads completely. By contrast, the same drop deposited on a sheet of plastic remains stuck in its place. Oil spreads out on cement. Water can ball up on a leaf etc. The conclusion is that there exist two regimes of wetting. Wetting can be characterized into two types total wetting (when liquid has a strong affinity for the solid) and partial wetting, the opposite case.

Hydrophobicity affects contact angle of water based solutions. Chemical interactions and material properties affect contact angle. Roughness of a surface and shape affect contact angle. It is regarding tailoring these properties and the ink to provide the desired result.

An electric field can change the contact angle. A number of electric fields effects may also control the flow of material down the needle brush 30. Electrostatic, electrophoretic, and magnetic fields can all affect the flow of ink material down the needle brush. Turning said fields on and off inhibits or facilitates the flow of in material down the needle brush.

The invention claimed is:

1. An apparatus for precisely depositing controlled quantities of a material comprising:
   a stage moveable in an x axis and an orthogonal y axis;
   a first needle incorporated into a probe of an atomic force microscope (AFM), the first needle having an adjustable position in the x axis and the y axis relative to the stage, the first needle having a tip;
   a second needle having a tip, the second needle having a an adjustable vertical offset with respect to the first needle, the adjustable vertical offset being substantially perpendicular to the stage and in a z axis direction orthogonal to both the x axis and the y axis;
   the adjustable vertical offset comprising an actuator coupled to the second needle, the actuator operative to cause the tip of the second needle to be a different height above the stage than the tip of the first needle;
   the tip of the first needle operative to move in a substantially parallel x-y plane with respect to the stage;
   the adjustable position of the first needle monitored by the AFM, the AFM operative to establish the different height of the second needle, the second needle configured to deposit additive material from the second needle onto the stage or a work piece via capillary action;
   the second needle operative to receive additive material.

2. The apparatus of claim 1, wherein at least one of the first needle or the second needle is a carbon nanotube.

3. The apparatus of claim 2, wherein the carbon nanotube of the second needle is constructed including a bend that supports a reservoir of additive material through surface tension.

4. The apparatus of claim 2, wherein the carbon nanotube of the second needle includes porous cavities, the porous cavities enabled to retain the additive material.

5. The apparatus of claim 2, wherein the carbon nanotube of the second needle is affixed at the base of an atomic force microscopy probe.

6. The of claim 5, wherein the atomic force microscopy probe is a Piezoresponse force microscopy probe and the stage is a piezo actuated stage.

7. The apparatus of claim 1, wherein adjusting the adjustable position of the needle includes at least one of:
   moving the stage under the first needle; or
   moving the first needle with a support including:
      a. lifting the first needle from the stage;
      b. adjusting the support relative to the stage; and
      c. lowering the first needle and second needle to the stage.

8. The apparatus of claim 1, wherein the capillary action of the second needle is facilitated by:
   regulating an electric or magnetic field on the second needle.

9. The apparatus of claim 8 where the electric or magnetic field interacts with additive material on the second needle to control the flow of the additive material on the second needle.

10. The apparatus of claim 1 where the second needle receives additive material from at least one of: additive material deposited on the work piece, a capillary tube in contact with the second needle, and an inkjet directed to deposit additive material to the second needle.

11. The apparatus of claim 1 where the first needle and second needle are positioned on a single cantilever.

12. The apparatus of claim 11 where a force is applied to the cantilever between the first needle and the second needle to adjust the second needle vertical offset to a desired value.

13. The apparatus of claim 1 where the first needle and second needle are positioned on the terminus of two substantially parallel cantilevers.

14. The apparatus of claim 1 where at least one of the first needle or the second needle is attached to a cantilever.

15. The apparatus of claim 1 where the first needle and second needle are attached to a first cantilever at a first needle end and a second cantilever at a second needle end.

16. The apparatus of claim 15 where the first cantilever has a first end opposite the first needle end and the second cantilever has an second end opposite the second needle end, the first end and second end coupled to a common support.

17. The apparatus of claim 1 where an ink flow from the second needle is controlled by an electric field or a magnetic field.

18. A 3D printer, comprising:
   a stage operative to be translated in orthogonal x and y axes which are co-planar to the stage;
   a first needle operative as a probe in an atomic force microscope (AFM), the AFM operative to maintain a substantially fixed separation distance to the stage with respect to a translation in the x and y axes;
   a needle brush coupled to a motorized arm actuator, the actuator operative to position the needle brush an elevation distance above the first needle, the elevation distance being in a z direction perpendicular to the x and the y axes, the needle brush collecting and depositing additive material ink onto the stage or a work piece, the needle brush positioned via the motorized arm actuator and configured to receive additive material ink at a base region and deposit the additive material ink from a tip region when the first needle is in contact with the stage or work piece positioned on the stage; and
   a materials pipette that excretes the additive material ink on to the base region of the needle brush.

19. The 3D printer of claim 18, wherein the materials pipette is an inkjet.

20. The 3D printer of claim 18, wherein the position of the materials pipette and the needle brush are maintained relative to one another.

21. The 3D printer of claim 18, further comprising:
   a flow control mechanism that has configurations to a) inhibit flow of ink off the needle and b) facilitate flow of ink off the needle.

22. A 3D printer comprising:
   a moveable stage operative to support a work piece, the moveable stage operative to translate in an x axis and a y axis coplanar to the moveable stage;
   a first needle having a needle tip and operative in an atomic force microscope (AFM), the first needle operative to contact the work piece or to hover a measurable distance above the work piece in a z axis which is maintained perpendicular to the x and y axes, the first needle coupled to a first cantilever;
   a second needle having a tip positioned an ink delivery distance above the moveable stage, the ink delivery distance being controlled by an actuator coupled to the second needle to cause the ink delivery distance to be greater than the measurable distance above the work piece of the tip of the first needle, such that when the first needle is in contact with the work piece, the second needle is the ink delivery distance above the work piece;
   the first needle maintaining a constant separation distance from the work surface when the moveable stage translates in the x or y direction;
   the first cantilever coupled to the second cantilever;
   the second needle operative to receive ink from an ink source.

23. The 3D printer of claim 22 where the first needle is located at the end of a cantilever beam and the second needle is located on the cantilever beam and separated from the first needle.

24. The 3D printer of claim 23 where the first needle is longer than the second needle.

25. The 3D printer of claim 22 where the first needle and second needle are the same length and the cantilever is a spring cantilever which is deflected with the first needle in contact with the work surface until the second needle is positioned at a desired ink printing distance above the work surface.

26. The 3D printer of claim 22 where the first needle is located on a first cantilever and the second needle is located on a second cantilever, the second cantilever supporting the needle an ink printing distance above the work surface when the first needle is in contact with the work surface.

27. The 3D printer of claim 22 where the second needle has a bend region operative to support liquid ink in the bend region.

28. The 3D printer of claim 22 where the ink source is at least one of: a pipette delivering ink to the second needle, an ink well on the work surface accessible to the second needle, a pipette delivering ink to the second needle, or an inkjet conveying ink to the second needle.

29. The 3D printer of claim 22 where the second needle is a brush.

30. The 3D printer of claim 22 where the second needle is operative to receive ink from an ink source and the flow of ink on the second needle is controlled by an electric or magnetic field.

31. An apparatus for precisely depositing controlled quantities of a material comprising:
- a stage moveable in an x axis and an orthogonal y axis;
- a first needle forming a probe of an atomic force microscope (AFM), the first needle having an adjustable position in the x axis and the y axis relative to the stage, the first needle having a tip;
- a second needle having a tip, the second needle operative to move in the x axis and y axis independently from the first needle, the second needle having an adjustable vertical offset with respect to the first needle, the adjustable vertical offset being substantially perpendicular to the stage and in a z axis direction orthogonal to both the x axis and y axis;
- the tip of the first needle operative to move in a substantially parallel x-y plane with respect to the stage;
- the adjustable position of the first needle monitored by the AFM, the first needle operative to establish the different height of the second needle, the second needle configured to deposit additive material from the second needle onto the stage or a work piece via capillary action;
- the second needle operative to receive additive material.

\* \* \* \* \*